Patented Aug. 10, 1943

2,326,233

UNITED STATES PATENT OFFICE 2,326,233

FIREPROOFING COMPOSITION

Martin Leatherman, Hyattsville, Md.

No Drawing. Application June 4, 1941,
Serial No. 396,537

12 Claims. (Cl. 252—8.1)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to fireproofing and is more particularly concerned with the fireproofing of fibrous materials, such as those having a cellulose or protein base of either natural plant fibers or artificial fibers. Specific examples of such materials are textiles, such as cotton, silk, rayon, wool, mohair, Nylon; braided materials, such as ropes and cords; felted materials, such as leather, either artificial or natural, paper, and so forth.

This invention embraces a new composition of matter which is applied to the material to be treated for the purpose of fireproofing it. I have discovered that a composition of matter containing both zinc carbonate and a chlorinated resin, such as paraffin wax, petroleum oil, preferably of the light bodied variety, commonly referred to as straw or neutral oils, chlorinated polymerized paracymene, chlorinated cottonseed oil, chlorinated naphthenic acids, either singly or mixtures of two or more, has excellent fireproofing properties. For best results the chlorinated resin should contain 50% or more of chlorine by weight, preferably 60%, or any amount in excess of 60%. The proportion of these two components should preferably be one part of the chlorinated resinous material to about one-quarter to one part by weight of zinc carbonate in finely divided form. The composition may be applied to the material to be treated in various ways. The preferred method, however, is to employ a volatile vehicle, such as mineral spirits, carbon tetrachloride, acetone, benzene, and so forth. The composition is mixed with the vehicle, the result of which is that the chlorinated resinous material dissolves therein while the finely divided zinc carbonate remains in suspension. The whole is then applied to the material either by spraying, dipping, painting, or by any other suitable means, and the vehicle permitted to volatilize, leaving in the fabric the zinc carbonate in finely divided form and a deposit of the chlorinated resinous material. If desired, the ingredients may be suspended in an aqueous vehicle and applied in the same manner as when a volatile vehicle is used. In using the aqueous vehicle, the chlorinated resin would be emulsified with the water.

The amount of the composition remaining in the treated material after evaporation of the vehicle may be varied as desired. However, it has been found that about 40%, more or less, of the composition by weight is satisfactory for general use. The action of the composition is as follows: When the material comes in contact with heat around 300° C. or above, the zinc carbonate decomposes liberating carbon dioxide, while the chlorinated resin liberates hydrogen chloride gas. At the same time any gases liberated from the material which would, under normal conditions, be combustible are mixed with both the carbon dioxide and hydrogen chloride gases, and, consequently, are unable to burn or ignite. Hydrogen chloride is liberated from the chlorinated resin at a much lower temperature than carbon dioxide is liberated from zinc carbonate by the action of heat alone. The latter reaction takes place around 300° C. which is also the ignition temperature of many fabrics. However, liberated hydrogen chloride gas from the chlorinated resin reacts with the zinc carbonate at temperatures below 300° C., resulting in the liberation of carbon dioxide and the formation of zinc chloride and water. This action has been definitely established by applicant in laboratory tests. Thus, by the use of zinc carbonate in combination with the chlorinated resin, the fireproofing gas, carbon dioxide, is liberated before the ignition temperature of the fabric is reachced. When the temperature reaches 300° C., or above, a further reaction takes place by the action of the heat on zinc carbonate, resulting in the formation of zinc oxide and carbon dioxide gas. The quantity of carbon dioxide gas liberated on this reaction is much greater than that which is liberated by the action of hydrogen chloride on the zinc carbonate because the amount of hydrogen chloride liberated from the chlorinated resin is relatively small. Consequently, at or above 300° C., the two reactions are taking place simultaneously, namely, the action of hydrogen chloride upon the zinc carbonate and the decomposing action of the heat on zinc carbonate. The formation of zinc oxide produces an added fireproofing factor. In cases where the material is of a cellulose composition, the zinc oxide acts as a dehydration catalyst causing the cellulose under the action of heat to split into carbon and water, thus preventing liberation of combustible gases which would ordinarily be liberated from cellulose if it were heated without a dehydration catalyst.

Fabrics treated with chlorinated resins when exposed to the sunlight liberate hydrogen chloride gas which, being acidic, has a deteriorating effect upon the fabric. The presence of zinc carbonate in the material, however, neutralizes the acid and protects the fabric against the deteriorating effect of the hydrogen chloride. Consequently, the fabrics treated according to this invention are not adversely affected by the presence of the chlorinated resin.

If desired, the composition described above may be introduced into the material together with any pigment or pigments, especially those possessing opacity for the purpose of protecting the material and the resin in the composition from the deteriorating effects of sunlight. Also, there may be included a filler to act as a siccative agent and in order to increase opacity of the composition. Fillers such as clay, bentonite, barytes, and so forth may be used. In addition, it is desirable in most cases to incorporate a plasticizer to render the material flexible in the presence of the other ingredients of the composition. Plasticizers such as tricresyl phosphate, triphenyl phosphate, chlorinated diphenyl, and so forth may be used. A preferred plasticizer is a chlorinated mixture of paraffin wax and petroleum oil, the chlorine content being such that the inflammability of the mixture is reduced to a minimum without changing its fluid state. For this purpose the chlorine content should be between 40% and 60%.

In addition to its fireproofing action as above described, zinc carbonate is also a well-known fungicide. Consequently, it tends to mildewproof the material. In cases where it is desired to increase this mildewproofing effect, other fungicides may be added, such as cadmium stearate, pentachlorphenol, cadmium pentachlorphenate, copper naphthenate, cadmium carbonate, cadmium oxide, copper carbonate, copper oxide, lead pentachlorphenate, and other compounds.

The following is an example of a preferred composition of matter according to this invention:

| | Per cent |
|---|---|
| Chlorinated resinous material, including a plasticizer not exceeding ⅓ of the weight of the total resinous component | 15 to 40 |
| Zinc carbonate | 5 to 20 |
| Pigment | 5 to 15 |
| Filler or loading agent | 5 to 15 |
| Solvent or water | To make up 100 |

The following examples will further clarify this invention, but it is to be understood that these examples are for the purpose of illustration only and not for the purpose of limitation.

*Example 1*

25 pounds of 60% chlorinated paraffin and 10 pounds of zinc carbonate are mixed with 67 pounds of mineral spirits. The resins dissolves in the mineral spirits and the zinc carbonate remains in suspension. The fabric to be treated is immersed therein until it is thoroughly wetted. The material is then passed between rollers, doctor blades, or other suitable devices, to remove enough of the composition to leave the desired amount thereof impregnated in the material. The amount of composition removed can be controlled by regulating the pressure of the rollers or, where doctor blades are used, by adjusting the tension of the material as it passes thereover. The material is then dried by any suitable means, such as by passing it over heated drums or by placing it in a chamber which is heated or ventilated or both.

*Example 2*

20 pounds of a chlorinated mixture of paraffin wax and paraffin oil containing 60% chlorine by weight, 6 pounds of zinc carbonate, 10 pounds of pigment, 5 pounds of tricresyl phosphate, as a plasticizer, and 3 pounds of bentonite are mixed together with 90 pounds of carbon tetrachloride. The chlorinated mixture and the tricresyl phosphate dissolve in the carbon tetrachloride, while the zinc carbonate, the pigment, and the bentonite remain in suspension. The mass is placed in a container, and the material to be treated is immersed and dried in the same manner as described in Example 1.

Other compositions which may be used in the same manner are as follows:

*Example 3*

| | Pounds |
|---|---|
| A chlorinated mixture of paraffin wax and paraffin oil, containing 62% chlorine by weight | 18 |
| Zinc carbonate | 10 |
| An opaque pigment | 12 |
| Liquid chlorinated diphenyl, as a plasticizer | 3 |
| Barytes | 3 |
| Mineral spirits | 60 |
| Cadmium naphthenate, as a fungicide | 1/10 |

Having thus described my invention, I claim:

1. A fireproofing composition containing zinc carbonate in finely divided form and a chlorinated resinous material which will liberate hydrogen chloride at temperatures below the decomposition point of zinc carbonate.

2. An article of manufacture comprising a textile material impregnated with a composition containing zinc carbonate in finely divided form and a chlorinated resinous material which will liberate hydrogen chloride at temperatures below the decomposition point of zinc carbonate.

3. A fireproofing composition containing zinc carbonate in finely divided form and a chlorinated resinous material of not less than 50% of chlorine by weight which will liberate hydrogen chloride gas at temperatures below the decomposition point of zinc carbonate.

4. An article of manufacture comprising a textile material impregnated with a composition containing zinc carbonate in finely divided form and a chlorinated resinous material of not less than 50% of chlorine by weight which will liberate hydrogen chloride at temperatures below the decomposition point of zinc carbonate.

5. A fireproofing composition containing zinc carbonate in finely divided form, a chlorinated resinous material which will liberate hydrogen chloride at temperatures below the decomposition point of zinc carbonate, and an opaque pigment.

6. A fireproofing composition containing zinc carbonate in finely divided form and a chlorinated mixture of paraffin wax and paraffin oil which will liberate hydrogen chloride at temperatures below the decomposition point of zinc carbonate.

7. A fireproofing composition containing zinc carbonate in finely divided form and chlorinated polymerized paracymene which will liberate hydrogen chloride at temperatures below the decomposition point of zinc carbonate.

8. A fireproofing composition containing zinc carbonate in finely divided form and chlorinated cottonseed oil which will liberate hydrogen chloride at temperatures below the decomposition point of zinc carbonate.

9. A fireproofing composition containing zinc carbonate in finely divided form and chlorinated naphthenic acid which will liberate hydrogen chloride at temperatures below the decomposition point of zinc carbonate.

10. A fireproofing composition containing zinc carbonate in finely divided form, a chlorinated resinous material which will liberate hydrogen chloride at temperatures below the decomposition point of zinc carbonate, an opaque pigment, and a plasticizer.

11. A fireproofing composition containing zinc carbonate in finely divided form, a chlorinated resinous material which will liberate hydrogen chloride at temperatures below the decomposition point of zinc carbonate, said resinous material containing at least 60% of chlorine by weight, an opaque pigment, and a chlorinated resinous material containing less than 60% chlorine by weight as a plasticizer.

12. A fireproofing composition containing zinc carbonate in finely divided form, a chlorinated resinous material which will liberate hydrogen chloride at temperatures below the decomposition point of zinc carbonate, said resinous material having a sufficient amount of chlorine to render it non-fluid, and a fluid chlorinated resinous material as a plasticizer.

MARTIN LEATHERMAN.